July 21, 1942.    S. A. HARRINGTON    2,290,427
BEARING PULLER
Filed March 14, 1941

Inventor
Samuel A. Harrington

By *Clarence A. O'Brien*

Attorney

Patented July 21, 1942

2,290,427

UNITED STATES PATENT OFFICE 2,290,427

BEARING PULLER

Samuel A. Harrington, San Francisco, Calif.

Application March 14, 1941, Serial No. 383,427

1 Claim. (Cl. 29—85)

This invention relates to new and useful improvements in bearing pullers, the same being a continuation-in-part of my application Serial No. 217,574, filed July 5, 1938.

The principal object of the present invention is to provide a bearing puller which can be used quickly and efficiently to remove bearings, especially of the shaft end type.

Another important object of the invention is to provide a bearing puller wherein the parts can be readily taken apart in the event replacements are necessary.

Other objects and advantages of the invention will become apparent to the reader of the following specification.

Figure 3:
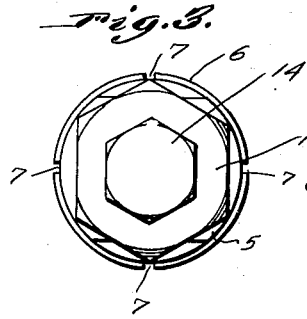
Figure 3 is an end elevational view of the puller.
Figure 4:
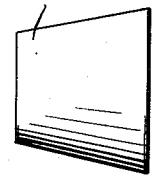
Figure 4 is a plan view of the wedge.

Referring to the drawing wherein like numerals designate like parts, it can be seen that the invention consists of a collar 5 having a sleeve 6 projecting therefrom and having a plurality of longitudinally disposed slit 7 therein extending from the free edge thereof. The collar 5 as shown in Figure 3 has flat peripheral portions to permit holding by an open end wrench. This free edge is flared outwardly as at 8 to engage behind a bearing structure 9, when the puller, with the parts retracted is inserted into a bearing and expanded. The type of bearing shown in Figure 1 is of the shaft end type, the bearing being located in a pocket of a wall structure 10.

The puller further consists of a nut 11 having an internal sleeve extension 12 which is both internally and externally threaded, the same being internally threaded to accommodate the elongated screw 13 provided with the polygonal head 14 at its outer end and externally threaded to accommodate the internal threads of a tapered annular wedge 15. The screw preferably has a rounded head 16 to fit into a centering opening 17 such as is found in connection with bored pockets 18, but, of course, this head 16 can operate with equal efficiency against a flat wall.

Figure 1:
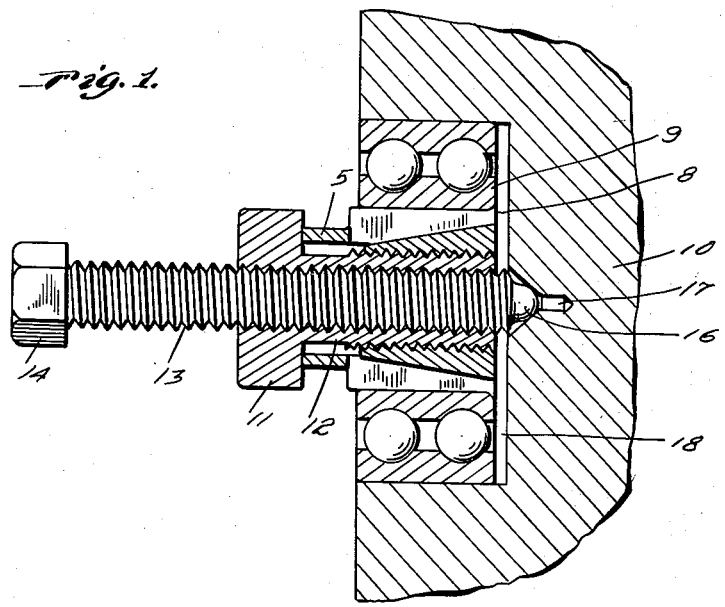
Figure 1 represents a sectional view longitudinally through part of the invention and a bearing structure with which the puller is engaged.
Figure 2:
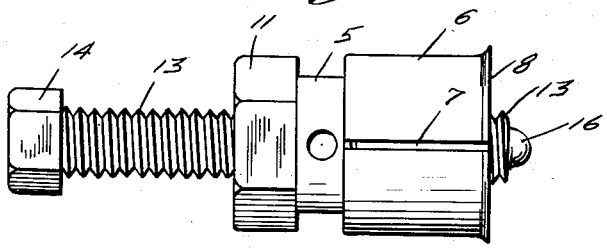
Figure 2 is a plan view of the puller.

It can be seen, that with the screw 13 retracted and the nut 11 likewise retracted so that the annular wedge 15 will be loose within the sleeve 16, the sleeve can be pushed through the bearing 9 from the left to the right in Figure 1 and when the sleeve 16 has been fully inserted, the nut 11 can be rotated. As the nut 11 starts to bind against the collar 5, the wedge 15 will be fed outwardly on the internal sleeve 12 with the resulting effect of expanding the sleeve 6 so that the lip or flared end 8 will abut the innermost side of the bearing 9. The nut 11 binding against the collar 5 will remain in place and by now feeding the screw 13 inwardly, the sleeves 6 and 12 will be forced outwardly as a unit carrying with them the bearing 9.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A puller for removing shaft end bearings from embracing structure comprising a tubular split body having a tapered internal end portion, an internally and externally threaded sleeve freely disposed into the body and provided with a tool engageable outer end portion, a screw having a tool engageable outer end portion feedable through the internally and externally threaded sleeve, a tapered internally threaded collet on the sleeve ridable against the inner side of the split body to expand the same when the remaining end of the internally and externally threaded sleeve is rotated against a bearing embracing structure to grip and expand said split body, said screw being feedable through the sleeve to impinge against the bearing embracing structure to force said sleeve, collet and split body carrying a bearing in a direction away from structure embracing said bearing.

SAMUEL A. HARRINGTON.